(12) United States Patent
Ban et al.

(10) Patent No.: US 10,091,802 B2
(45) Date of Patent: Oct. 2, 2018

(54) ELECTONIC APPARATUS, WIRELESS COMMUNICATION METHOD THEREOF, AND NON-TRANSITORY COMPUTER READABLE RECORDING MEDIUM

(71) Applicant: Samsung Electronics Co., Ltd., Suwon-si, Gyeonggi-do (KR)

(72) Inventors: Dae-hyun Ban, Seoul (KR); Woo-jin Park, Yognin-si (KR); Sang-soon Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 15/175,747

(22) Filed: Jun. 7, 2016

(65) Prior Publication Data

US 2016/0366695 A1 Dec. 15, 2016

Related U.S. Application Data

(60) Provisional application No. 62/174,347, filed on Jun. 11, 2015.

(30) Foreign Application Priority Data

Jan. 22, 2016 (KR) .................. 10-2016-0008209

(51) Int. Cl.
*H04W 72/12* (2009.01)
*H04W 28/02* (2009.01)
(Continued)

(52) U.S. Cl.
CPC .......... *H04W 72/1215* (2013.01); *H04J 3/14* (2013.01); *H04L 43/0864* (2013.01); *H04W 4/80* (2018.02);
(Continued)

(58) Field of Classification Search
CPC .............. H04W 72/1215; H04W 4/80; H04W 28/0221; H04W 88/06; H04J 3/14;
(Continued)

(56) References Cited

U.S. PATENT DOCUMENTS

| 8,310,964 B2 | 11/2012 | Grushkevich |
| 2008/0069065 A1* | 3/2008 | Wu ...................... H04W 36/08 370/340 |

(Continued)

FOREIGN PATENT DOCUMENTS

WO  2013-170482 A1  11/2013

OTHER PUBLICATIONS

Tian et al., TCP in Wireless Environments: Problems and Solutions.

*Primary Examiner* — Afsar M Qureshi
(74) *Attorney, Agent, or Firm* — Jefferson IP Law, LLP

(57) ABSTRACT

An electronic apparatus, a wireless communication method, and a non-transitory computer readable recording medium are provided. The electronic apparatus includes a communicator configured to transmit and receive packets using a first communication method and a second communication method, the first communication method and the second communication method being different from each other, and a processor configured to control the communicator to perform wireless communication in the first communication method and the second communication method alternately, and, in response to there being a need to switch to the second communication method in the middle of using the first communication method, control the communicator to transmit notification information to another apparatus of the first communication method to halt transmission of packets and wait.

17 Claims, 17 Drawing Sheets

(51) Int. Cl.
  *H04W 4/80* (2018.01)
  *H04J 3/14* (2006.01)
  *H04L 12/26* (2006.01)
  *H04W 88/06* (2009.01)

(52) U.S. Cl.
  CPC ........ *H04W 28/0221* (2013.01); *H04W 88/06* (2013.01)

(58) Field of Classification Search
  CPC ... H04L 43/0864; H04L 69/26; H04L 12/282; H04L 43/14; H04L 43/18
  USPC ........................................................ 370/230
  See application file for complete search history.

(56) References Cited

U.S. PATENT DOCUMENTS

| | | | |
|---|---|---|---|
| 2008/0259837 A1* | 10/2008 | Thoukydides | ........ H04W 16/14 370/311 |
| 2011/0194546 A1* | 8/2011 | Sanguinetti | .......... H04B 1/0053 370/338 |
| 2014/0056288 A1 | 2/2014 | Wyper et al. | |
| 2014/0134990 A1 | 5/2014 | Chou | |
| 2014/0164641 A1* | 6/2014 | Ye | ........................ H04L 47/127 709/235 |

\* cited by examiner

ELECTONIC APPARATUS, WIRELESS COMMUNICATION METHOD THEREOF, AND NON-TRANSITORY COMPUTER READABLE RECORDING MEDIUM

CROSS-REFERENCE TO RELATED APPLICATION(S)

This application claims the benefit under 35 U.S.C. § 119(e) of a U.S. Provisional application filed on Jun. 11, 2015 in the U.S. Patent and Trademark Office and assigned Ser. No. 62/174,347, and under 35 U.S.C. § 119(a) of a Korean patent application filed on Jan. 22, 2016 in the Korean Intellectual Property Office and assigned Serial number 10-2016-0008209, the entire disclosure of each of which is hereby incorporated by reference.

TECHNICAL FIELD

The present disclosure relates to an electronic apparatus, a wireless communication method thereof, and a non-transitory computer readable recording medium. More particularly, the present disclosure relates to an electronic apparatus which can enhance wireless communication performance of the electronic apparatus having a plurality of heterogeneous wireless network interfaces mounted therein, without correcting another existing electronic apparatus, a wireless communication method thereof, and a non-transitory computer-readable recording medium.

BACKGROUND

As wireless communication technology is applied to portable small electronic apparatuses, various methods for reducing the area occupied by elements and increasing their performance are used. The representative example is a combo chip which is implemented to use one of the various wireless communication methods according to necessity.

The related-art combo chip supports the existence of a plurality of wireless communication methods based on the time division multiplexing (TDM) method. The occupancy of time-divided time slots may be achieved by generating occupancy signals in respective wireless modules in the electronic apparatuses.

Most of the transport layer protocols of the wireless communication are based on a transmission control protocol (TCP). Therefore, there is a problem that the electronic apparatus does not distinguish between disconnection and congestion when the electronic apparatus operates in the TDM.

In addition, when the plurality of wireless communication methods are utilized simultaneously to overcome the above-described problem, there is a problem that wireless communication performance seriously deteriorates.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus which can enhance wireless communication performance by sharing information on a switch of time slot occupancy between communication modules, a wireless communication method thereof, and a non-transitory computer readable recording medium.

In accordance with an aspect of the present disclosure, an electronic apparatus is provided. The electronic apparatus includes a communicator configured to transmit and receive packets using a first communication method and a second communication method, the first communication method and the second communication method being different from each other, and a processor configured to control the communicator to perform wireless communication in the first communication method and the second communication method alternately, and, in response to there being a need to switch to the second communication method in the middle of using the first communication method, control the communicator to transmit notification information to another apparatus of the first communication method to halt transmission of packets and wait.

In accordance with another aspect of the present disclosure, a wireless communication method of an electronic apparatus is provided. The wireless communication method includes wirelessly communicating in a first communication method and, in response to there being a need to switch to a second communication method in the middle of using the first communication method, transmitting notification information to another apparatus of the first communication method to halt transmission of packets and wait.

In accordance with another aspect of the present disclosure, a non-transitory computer readable recording medium is provided. The non-transitory computer readable recording medium includes a program for executing a wireless communication method of an electronic apparatus, the wireless communication method including wirelessly communicating in a first communication method, in response to there being a need to switch to a second communication method in the middle of using the first communication method, transmitting notification information to another apparatus of the first communication method to halt transmission of packets and wait.

According to various embodiments described above, the wireless communication performance of the electronic apparatus having a plurality of heterogeneous network interfaces mounted therein can be enhanced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term such as "first" and "second" used in various embodiments may be used to explain various elements, but does not limit the corresponding elements. These terms may be used for the purpose of distinguishing one element from another element. For example, a first element may be named a second element without departing from the scope of right of various embodiments of the present disclosure, and similarly, a second element may be named a first element. The term "and/or" includes a combination of a plurality of relevant items or any one of the plurality of relevant items.

The terms "include", "have," etc. used in the various embodiments of the present disclosure indicate the presence of features, numbers, functions, operations, elements, parts set forth in the specification, or a combination thereof, and do not preclude the presence or addition of one or more other features, numbers, functions, operations, elements, parts, or a combination thereof.

Figure 1:
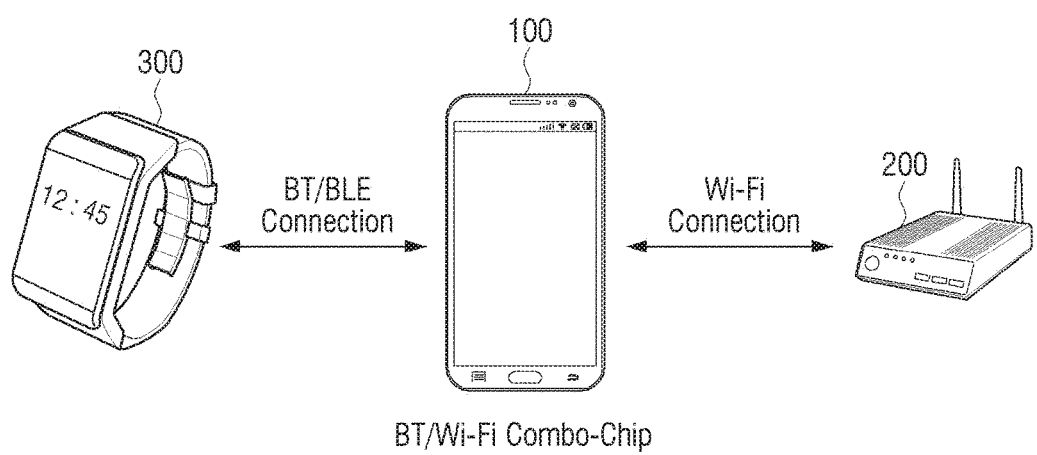
FIG. 1 is a view to illustrate a wireless communication system according to an embodiment of the present disclosure.

FIG. 1 is a view illustrating a wireless communication system according to an embodiment of the present disclosure.

Referring to FIG. 1, an electronic apparatus 100 is illustrated as a smart phone which is provided with a combo chip supporting a Wi-Fi communication method and a Bluetooth (BT) communication method. However, this should not be considered as limiting. For example, the electronic apparatus 100 may be implemented by using all kinds of electronic apparatuses which support a plurality of wireless communication methods, such as a smart phone, a laptop, a tablet, a smart television (TV), etc. Many mobile devices or laptops may perform wireless communication using the combo chip supporting a plurality of wireless interfaces.

A first external apparatus 200 is an external apparatus which may communicate with the electronic apparatus 100 in a first communication method. In FIG. 1, the first external apparatus 200 is illustrated as an access point (AP) to communicate with the electronic apparatus 100 through Wi-Fi. However, this should not be considered as limiting.

A second external apparatus 300 is an external apparatus which may communicate with the electronic apparatus 100 in a second communication method. In FIG. 1, the second external apparatus 300 is illustrated as a smart watch to communicate with the electronic apparatus 100 through BT or BT low energy (BLE). However, this should not be considered as limiting. For example, the second external apparatus 300 may be implemented by using all kinds of electronic apparatuses which can communicate with the electronic apparatus 100 in the second communication method different from the first communication method, such as a wearable device, a smart phone, a tablet, a BT speaker, a smart TV, etc.

The electronic apparatus 100 may perform wireless communication in a plurality of methods using a single antenna. Accordingly, the electronic apparatus 100 may allocate a plurality of communication modules time to use the single antenna using a time division multiplexing (TDM) method. Deterioration of communication performance caused by a switch of a wireless communication method, and a solution according to various embodiments is explained in further detail below.

Figure 2:
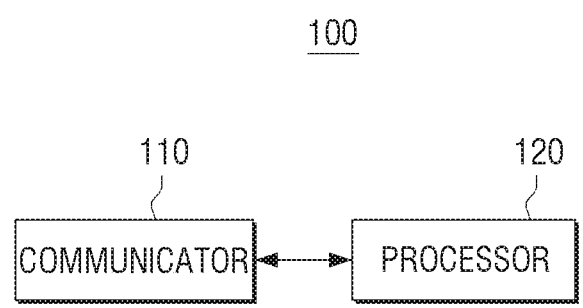
FIG. 2 is a schematic block diagram to illustrate a configuration of an electronic apparatus according to an embodiment of the present disclosure.

FIG. 2 is a schematic block diagram to illustrate the configuration of the electronic apparatus 100 according to an embodiment of the present disclosure.

Referring to FIG. 2, the electronic apparatus 100 may include a communicator 110 and a processor 120. In the embodiment of FIG. 2, the communicator 110 and the processor 120 are illustrated as separate elements, but are not limited to this. The communicator 110 and the processor 120 may be implemented by using a single chip.

The communicator 110 may transmit and receive packets using a plurality of different communication methods. For example, the communicator 110 may communicate with external apparatuses using different first and second communication methods. The first communication method may be one of Wi-Fi and Wi-Fi direct. In addition, the second communication method may be one of BT BLE, and ZigBee.

The processor 120 may control the communicator 110 to perform wireless communication using the first communication method and the second communication method alternately. For example, through the TDM method, the processor 120 may allocate a time slot to a communication module using the first communication method and a communication module using the second communication method. That is, the processor 120 may schedule the first communication method and the second communication method to occupy the time slot alternately.

In response to there being a need to switch from the first communication method in use to the second communication method, the processor 120 may control the communicator 110 to transmit notification information to another apparatus using the first communication method (for example, the first external apparatus 200).

The notification information may include a content informing the first external apparatus 200 that the electronic apparatus 100 cannot receive packets. The processor 120 may transmit the notification information, thereby controlling the first external apparatus 200 which receives the notification information to halt transmission of the packets and stand by. In addition, the first external apparatus 200 which receives the notification information may maintain a transmission buffer size of a transport layer. For example, when the communicator 110 was receiving 32 packets before transmitting the notification information, the first external apparatus 200 which receives the notification information may maintain the size of the transmission buffer corresponding to the 32 packets despite the fact that communication connection is halted.

In response to there being a need to switch to the first communication method again while the processor 120 which switched to the second communication method are communicating with the second external apparatus 300, the processor 120 may control the communicator 110 to transmit resuming information to another apparatus using the first communication method (for example, the first external apparatus 200).

The resuming information may include a content informing the first external apparatus 200 that the electronic apparatus 100 can receive packets again. The processor 120 may transmit the resuming information, thereby controlling the first external apparatus 200 which receives the resuming information to resume transmitting as many packets as the maintained size of the transmission buffer.

Accordingly, the electronic apparatus 100 and the first external apparatus 200 do not reset the size of the transmission buffer to the size of 1 packet to resume communication, and resume communication with the size of the transmission buffer corresponding to the size of packets which are determined to be transmitted before the communication connection is halted. The first communication method may gradually increase the size of the transmission buffer of the transport layer by taking into consideration the buffer size of the packets that the electronic apparatus 100 is able to receive while maintaining communication.

The processor 120 may adjust the time to transmit the notification information and the resuming information by taking into consideration time required to communicate with the first external apparatus 200. For example, the processor 120 may adjust the time to transmit the notification information and the resuming information by taking into consideration round-trip time (RTT) with respect to another apparatus using the first communication method. The RTT is the time it takes for a packet to be transmitted plus the time it takes for a response to be returned in the transmission control protocol (TCP).

The processor 120 may measure average RTT with respect to another apparatus using the first communication method. In addition, the processor 120 may control the communicator 110 to transmit the notification information and the resuming information to another apparatus using the first communication method in advance as much time as half of the measured average RTT before the communication method is switched.

Figure 3:
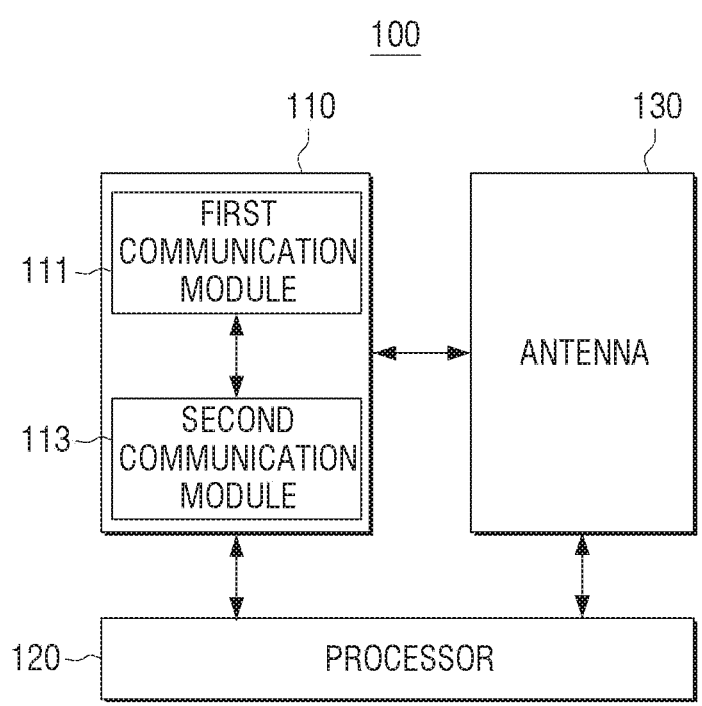
FIG. 3 is a block diagram to illustrate the configuration of the electronic apparatus in detail according to an embodiment of the present disclosure.

FIG. 3 is a block diagram to illustrate the configuration of the electronic apparatus 100 in detail according to an embodiment of the present disclosure.

Referring to FIG. 3, the electronic apparatus 100 may include a communicator 110, a processor 120, and an antenna 130.

The communicator 110 may communicate with external apparatuses in a plurality of communication methods. The communicator 110 may include a first communication module 111 using a first communication method and a second communication module 113 using a second communication method.

For example, the first communication method may be one of Wi-Fi and Wi-Fi direct. As another term, the first communication method may be referred to as wireless local area network (WLAN) communication. In addition, the second communication method may be one of BT and BLE. However, the second communication method is not limited to these and may be other wireless communication methods such as ZigBee, infrared data association (IrDA). The antenna 130 may include a logic, a circuitry, and a code to transmit and receive through the first communication method and the second communication method. By doing so, the antenna 130 may perform a plurality of communication protocols. A bandpass filter (not shown) and a switch (not shown) may further be included between the communicator 110 and the processor 120, and the antenna 130.

The processor 120 and the communicator 110 may be implemented by using a single chip. The processor 120 may perform wireless communication in the first communication method and the second communication method using the antenna 130.

The processor 120 may allocate a time slot to each of the communication modules 111 and 113 in the TDM method. The communication modules 111 and 113 allocated the time slot may wirelessly communicate with external apparatuses through the antenna 130 while occupying the allocated time slot.

Figure 4:
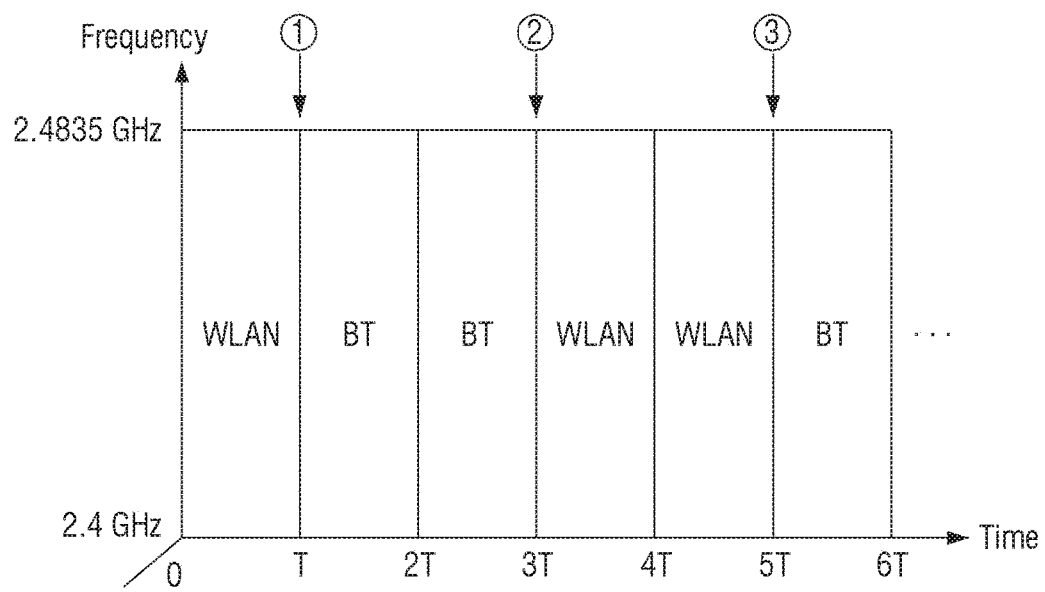
FIG. 4 is a view to illustrate a switch of time slot occupancy in a time division multiplexing (TDM) method according to an embodiment of the present disclosure.

FIG. 4 is a view to illustrate time slot occupancy switch in the TDM method. According to one or more embodiments, the first communication method in the embodiment of FIG. 4 is WLAN, and the second communication method is BT. In addition, in some embodiments of FIG. 4, both the WLAN and the BT operate in the band of 2.4 GHz (2.4000-2.4835 GHz). However, in the case of Wi-Fi which uses the band of 5 GHz, the processor 120 allocates the time slot in the TDM method to occupy the antenna 130, like in the case of WLAN and BT operate in the same frequency band. Accordingly, the frequency bands of the first communication method and the second communication method are not necessarily identical to each other. In addition, the frequency band in various embodiments is not always limited to the band of 2.4 GHz.

Referring to FIG. 4, six (6) time slots are allocated to the first communication method (WLAN) and the second communication method (BT). At time slots 0-T, 3T-4T, and 4T-5T, the communicator 110 may wirelessly communicate with the first external apparatus 200 in the first communication method. In addition, at time slots T-2T, 2T-3T, and 5T-6T, the communicator 110 may wirelessly communicate with the second external apparatus 300 in the second communication method.

In the related-art combo chip, there is a problem that communication performance in the first communication method using a TCP deteriorates at the time when the wireless communication method is switched like times ①, ②, and ③.

Attempts to prevent deterioration in the communication performance through a coexistence technique in a media access control (MAC) layer (or a data link layer) from among open system interconnection (OSI) reference models face challenges. For example, this method does not consider an application layer and a transport layer and there was a problem that performance was not enhanced according to the purpose of use of the electronic apparatus 100.

The electronic apparatus 100 according to various embodiments can enhance the communication performance by detecting a wireless technology utilization state in a TCP which is a protocol of a transport layer normally utilized by the user.

The transport layer of the layers of the OSI reference model enables users existing from end to end to transmit and receive reliable data. The representative of the transport layer is the TCP.

The transport layer uses a sequence number-based error control method. The transport layer identifies whether transmission of packets is valid and re-transmits the packets which fail to be transmitted. For example, when it is identified that the transmission is valid by transmitting one packet first, the transport layer transmits two packets next time. In this way, the transport layer gradually increases the size of the transmission buffer. This may be referred to as a slow start method, and a transmission speed increases in the form of an exponential function (for example, 1→2→4→8). To the contrary, in response to a communication network condition being poor and congestion occurring, the size of the transmission buffer is reduced.

A TCP receive window (RWIN) refers to the size of data that a receiving end (for example, the electronic apparatus 100) can receive at a time without a response (acknowledgement (ACK)). That is, the TCP RWIN refers to the size of an available buffer. A TCP congestion window (CWND) refers to the size of data that a transmitting end (for example, the first external apparatus 200) can transmit at a time without a response (ACK).

The processor 120 switches the communication method from the first communication method to the second communication method at times ① and ③ as shown in FIG. 4. That is, disconnection in communication occurs in the TCP. However, the related-art combo chip has a problem that congestion and disconnection are not distinguished from each other. Accordingly, temporary disconnection in communication may influence TCP congestion control.

That is, when the electronic apparatus 100 transmits data according to the TCP through the WLAN, the first communication module 111 may experience disconnection of the WLAN during the time slot in which the BT is allocated. Accordingly, in response to the communication method being switched, the related-art combo chip processes in the same way as when congestion occurs and thus degrades communication performance.

The electronic apparatus 100 according to various embodiments may take a different measure according to a cause of performance deterioration in controlling congestion. The electronic apparatus 100 may distinguish between actual congestion and temporary disconnection which is caused by scheduling, and perform communication.

Figure 5A:
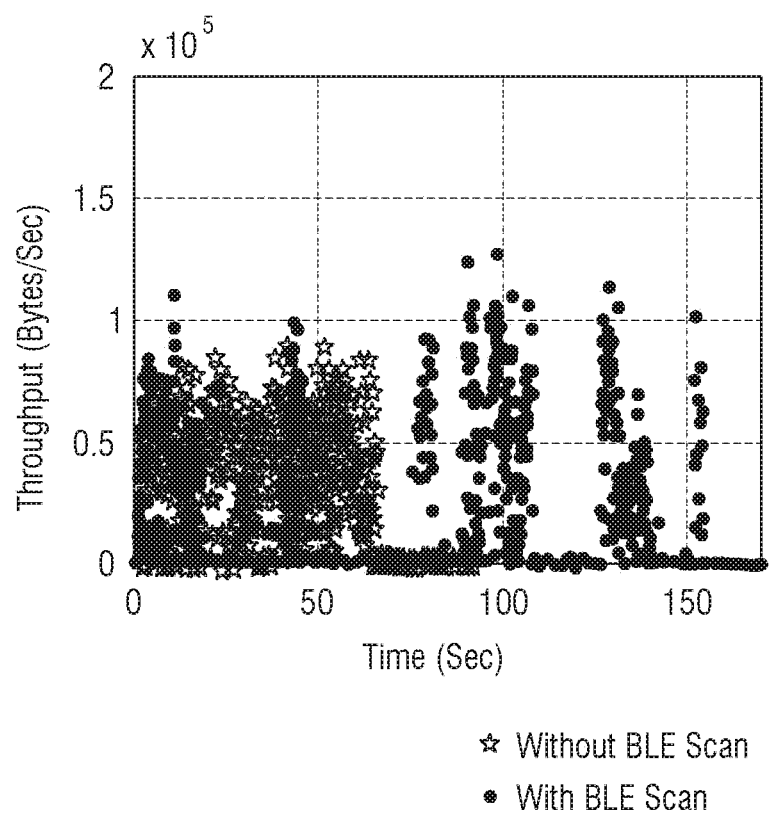
FIGS. 5A and 5B are views to illustrate throughput deterioration in an electronic apparatus according to various embodiments of the present disclosure.
Figure 5B:
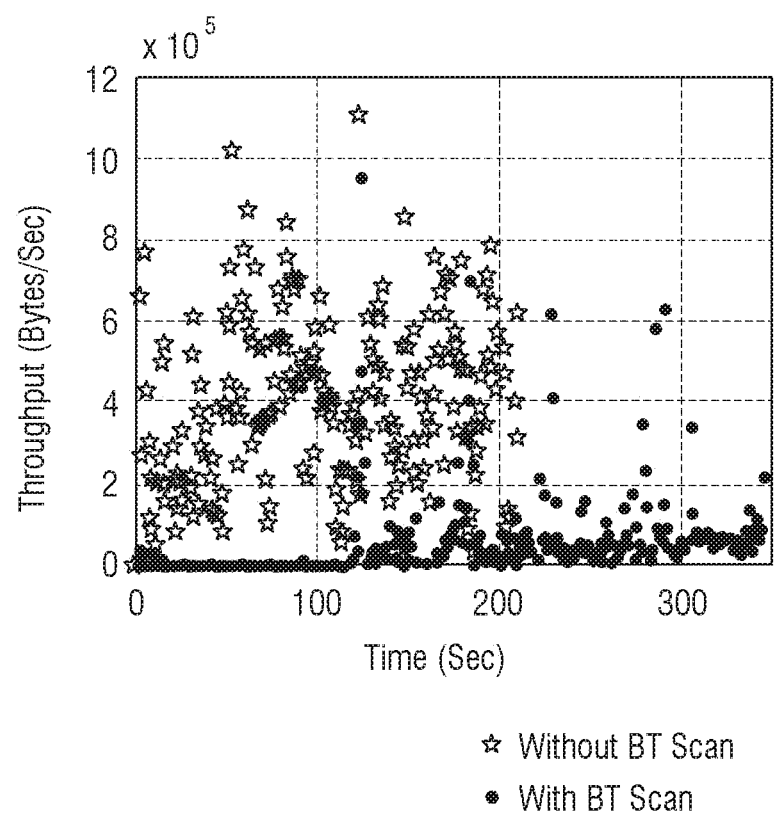

FIGS. 5A and 5B are views to illustrate deterioration in a throughput in the electronic apparatus 100 according to various embodiments of the present disclosure.

Referring to FIG. 5A is a graph showing a result of measuring a throughput when the electronic apparatus 100 is a smart phone. The smart phone includes a Wi-Fi/BLE combo chip and a single antenna configuration. In the experiment of FIG. 5A, time required to download a file was measured in two cases. The electronic apparatus 100 spent 61 seconds downloading a file when using only Wi-Fi without BLE scanning. However, when the BLE scanning was activated, the time required to download the file increased to 162 seconds.

Referring to FIG. 5B is a graph showing a result of measuring a throughput when the electronic apparatus 100 is a laptop. The lap top includes a Wi-Fi/BT combo chip and a single antenna configuration. Likewise, in the experiment of FIG. 5B, a throughput by transmission of a file was measured in two cases. When BT scanning was activated, the throughput was reduced by about 86% in comparison to the case in which only Wi-Fi was used without BT scanning.

Figure 6A:
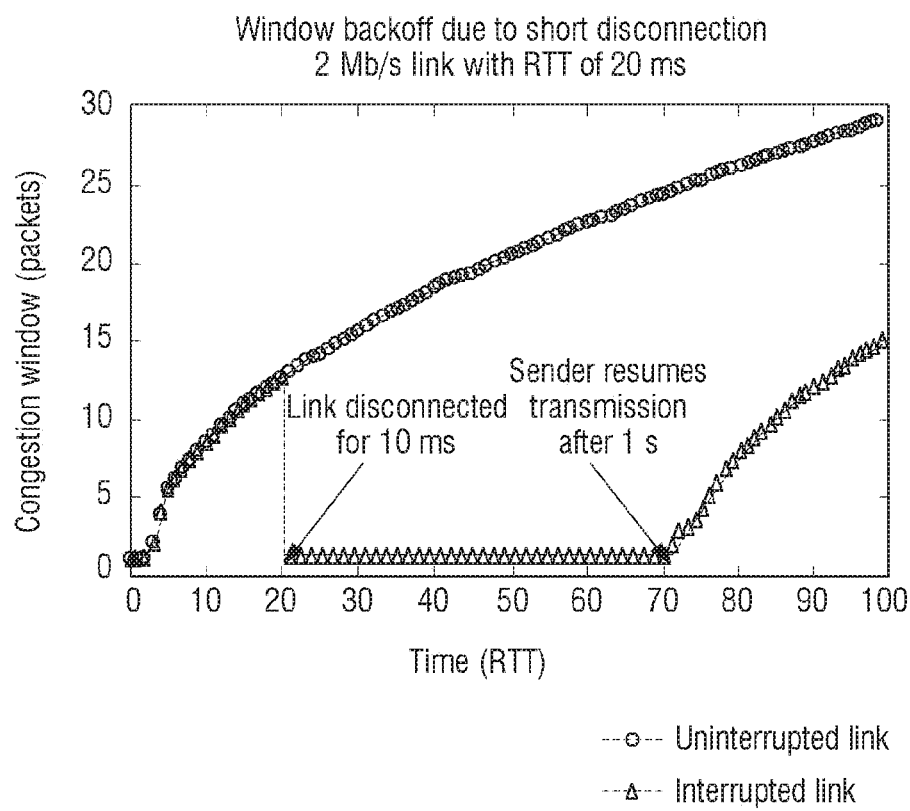
FIGS. 6A and 6B are views to illustrate prominent performance deterioration which is caused even by short-time disconnection according to various embodiments of the present disclosure.
Figure 6B:
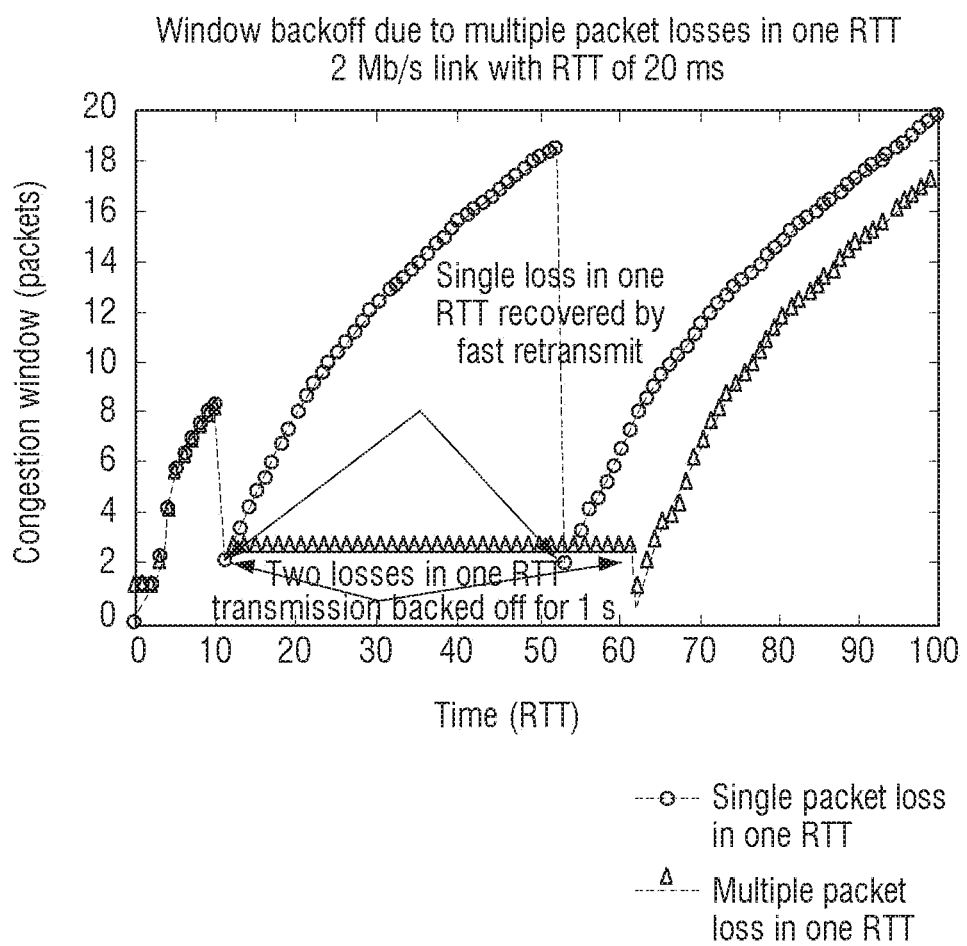

FIGS. 6A and 6B are views to illustrate to prominent deterioration in performance which is caused even by short-time disconnection according to various embodiments of the present disclosure.

Referring to FIGS. 6A and 6B, the horizontal axis indicates RTT and the vertical axis indicates the number of transmission packets. The term "congestion window" refers to the number of packets which are transmitted by a transmitting end at a time. In the embodiments of FIGS. 6A and 6B, the experiment was conducted in an environment in which wireless communication had link capacity of 2 Mb/s and RTT of 20 ms.

Referring to FIG. 6A, when communication is disconnected during 10 ms, the related-art combo chip resumes communication after 1 second (50 RTT) elapses. In addition, although the communication is resumed, there is a problem that a packet transmission unit is initialized. Referring to the example of FIG. 6A, the transmitting apparatus is able to transmit in the unit of about 13 packets before communication is disconnected, but, after communication is resumed, starts transmitting in the unit of 1 packet.

FIG. 6B is a view to illustrate a result when an attempt is made to enhance performance in a fast retransmit method. When communication is disconnected once during 1 RTT (for example, a single packet is lost during RTT), the related-art combo chip may resume communication in the fast retransmit method. However, even when the communication is resumed in the fast retransmit method, the problem that the packet transmission unit is initialized is not solved. In addition, when communication is disconnected two or more times during 1 RTT (for example, two or more packets are lost during RTT), the related-art combo chip cannot even apply the fast transmit method.

Figure 7:
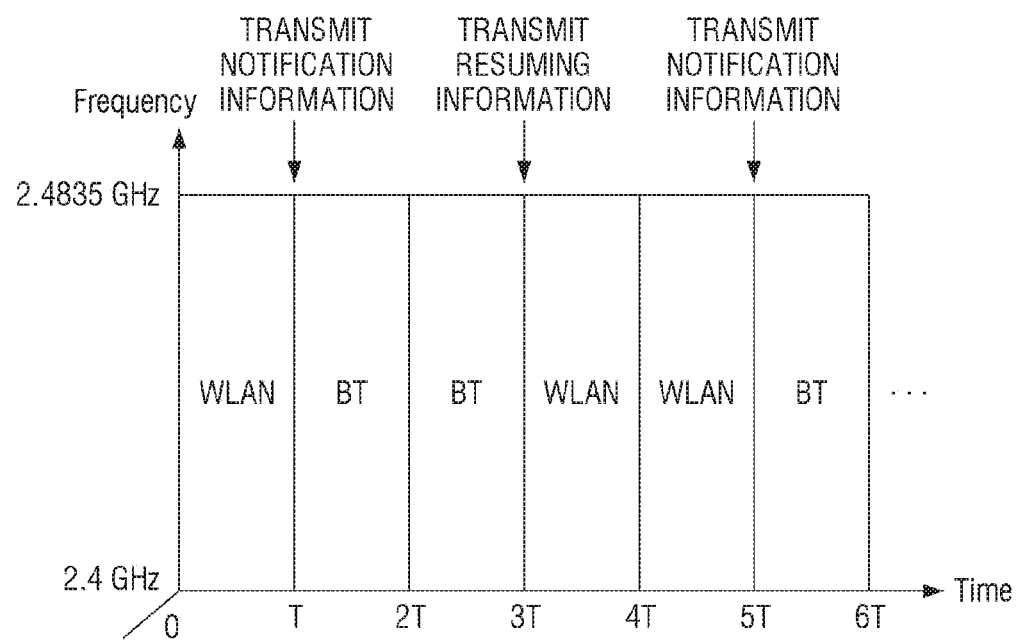
FIG. 7 is a view to illustrate transmission of notification information of an electronic apparatus according to an embodiment of the present disclosure.

FIG. 7 is a view to illustrate transmission of notification information of the electronic apparatus 100 according to an embodiment of the present disclosure. To solve a problem that time slot occupying time of other wireless modules results in disconnection when the TCP is used and thus communication performance deteriorates, the processor 120 may share information on time slot occupancy with another apparatus using the first communication method which uses the TCP.

Referring to FIG. 7, the processor 120 may wirelessly communicate with the first external apparatus 200 through the first communication module 111 in the first communication method. In addition, the processor 120 may determine whether it is necessary to switch to the second communication method while using the first communication method.

The processor 120 may be requested by applications to use WLAN communication and BT communication. In addition, the processor 120 may allocate time slots to the WLAN communication and the BT communication. In the example of FIG. 7, the processor 120 may allocate a time slot to the WLAN communication during 0-T, and allocate a time slot to the BT communication during T-2T. In this way, the processor 120 may schedule for use of the antenna in the TDM method. In addition, the processor 120 may recognize the time to switch the communication method according to the schedule.

At the time when the first communication method is switched to the second communication method (for example, time T of FIG. 7), the processor 120 may control the communicator 110 to transmit notification information to the first external apparatus 200. The notification information is information for instructing the first external apparatus 200 to halt transmission of packets and stand by. In addition, the notification information is information for instructing to maintain the size of the transmission buffer of the transport layer.

Specifically, the processor 120 may generate a zero window advertisement and inform the first external apparatus 200 that the electronic apparatus 100, which is a current receiving end, cannot receive the packets. The processor 120 may transmit the zero window advertisement, thereby controlling the first external apparatus 200 to halt TCP transmission. In addition, the processor 120 controls to maintain the size of the transmission buffer and thus prevents from the packet transmission unit from being initialized when communication is resumed in the first communication method. As long as deterioration in performance of the TCP such as inability to transmit does not occur when communication is resumed, the electronic apparatus 100 can receive data in the packet transmission unit at the time when communication is disconnected.

The processor 120 may switch to the second communication method and determine whether it is necessary to switch to the first communication method while communicating with the second external apparatus 300. In addition, at the time when the second communication method is switched to the first communication method (for example, at time 3T of FIG. 7), the processor 120 may control the communicator 110 to transmit resuming information to the first external apparatus 200. The resuming information may include a content informing the first external apparatus 200 that the electronic apparatus 100 can receive the packets again. The processor 120 may transmit the resuming information, thereby controlling the first external apparatus 200 which receives the resuming information to resume transmitting as many packets as the maintained size of the transmission buffer.

Specifically, the processor 120 may transmit a signal for canceling the zero window advertisement to the first external apparatus 200. By doing so, the processor 120 may control the first external apparatus 200 to resume transmitting as many packets as the size of the transmission buffer before communication is disconnected.

According to an embodiment, the electronic apparatus 100 can enhance its transmission performance by additionally sharing information of a small capacity (for example, 1 bit) such as the notification information and the resuming information. In addition, since there is no need to correct an existing communication infrastructure and only the TCP at the receiving end is corrected, the wireless communication performance of the electronic apparatus 100 can be enhanced at a low cost.

Figure 8:
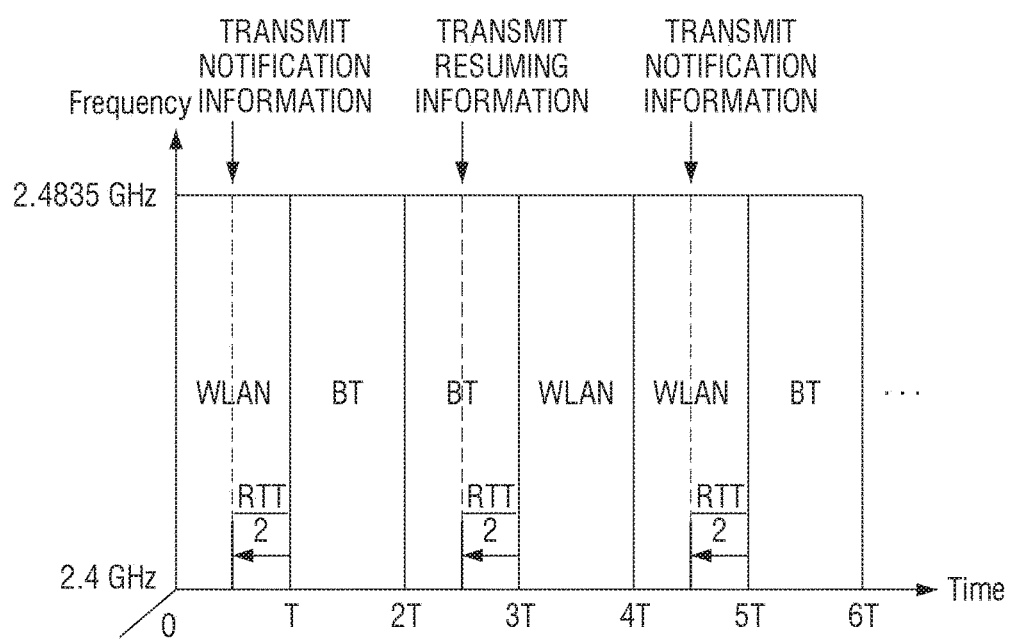
FIG. 8 is a view to illustrate transmission of notification information by taking into consideration round trip time (RTT) of an electronic apparatus according to an embodiment of the present disclosure.

FIG. 8 is a view to illustrate transmission of notification information by taking into consideration RTT of the electronic apparatus 100 according to an embodiment of the present disclosure. The RTT is the time it takes for a packet to be transmitted plus the time it takes for a response (ACK) to be returned in the TCP. That is, the time it takes for the first external apparatus to receive the notification information transmitted by the electronic apparatus 100 corresponds to half of the RTT. When the notification information or resuming information is transmitted by taking into consideration the time necessarily required to perform communication as described above, the electronic apparatus 100 can achieve an additional performance enhancement effect.

The processor 120 may measure average RTT with respect to another apparatus using the first communication method (for example, the first external apparatus 200). In addition, the processor 120 may transmit the notification information or the resuming information to the first external apparatus 200 in advance before the communication method is switched, by taking into consideration the measured average RTT.

For example, referring to FIG. 8, the processor 120 may control the communicator 110 to transmit the notification information or the resuming information to the first external apparatus 200 in advance as much time as half of the measured average RTT before the communication method is switched. In response to the notification information being transmitted in advance as much time as half of the average RTT, the time at which the first external apparatus 200 receives the notification information and halts the transmission of the packets may be the same as the time at which the processor 120 switches from the first communication method to the second communication method. In addition, in response to the resuming information being transmitted in advance as much time as half of the average RTT, the time at which the first external apparatus 200 receives the resuming information and resumes transmitting the packets may be the same as the time at which the processor 120 switches from the second communication method to the first communication method.

However, the present disclosure is not limited to the embodiment in which the notification information is transmitted in advance as much time as half of the measured average RTT. As long as RTT delay is considered, the time of transmitting the notification information may be advanced in various ways.

Figure 9:
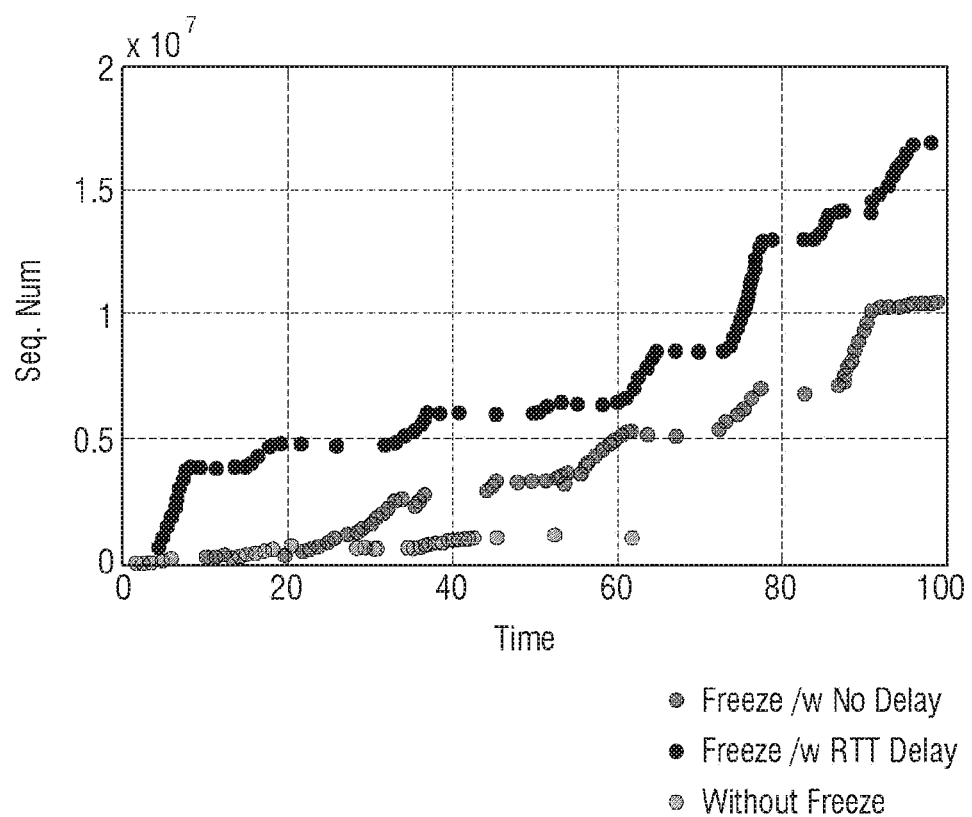
FIG. 9 is a view illustrating difference in performance between a wireless communication method according to an embodiment of the present disclosure and a wireless communication method of the related art.

FIG. 9 is a graph showing a difference in performance between a wireless communication method according to various embodiments of the present disclosure and a wireless communication method of the related art.

Referring to FIG. 9, the horizontal axis indicates time and the vertical axis indicates a sequence number. The sequence number refers to a unique number which is assigned to each packet when data is transmitted in the TCP. That is, it can be seen from FIG. 9 that the performance of communication is the best when the sequence number rapidly increases with time.

FIG. 9 shows three kinds of measurement values. In the embodiment of FIG. 9, the term "freeze" means that the processor 120 transmits the notification information and controls the first external apparatus 200 to halt transmission of packets. The first measurement values (Freeze/w No Delay) show communication performance of the electronic apparatus 100 which transmits the notification information according to an embodiment. The second measurement values (Freeze/w RTT Delay) show communication performance of the electronic apparatus 100 which considers RTT in addition to the notification information according to an embodiment. The final measurement values (Without Freeze) show communication performance of the related-art combo chip.

Referring to FIG. 9, the communication methods according to various embodiments have ten times higher communication speed than the related-art communication method. In particular, in the embodiment in which the RTT is considered, time inevitably consumed according to a communication distance is utilized and thus communication speed is enhanced in comparison to the embodiment in which only the notification information is used.

Figure 10A:
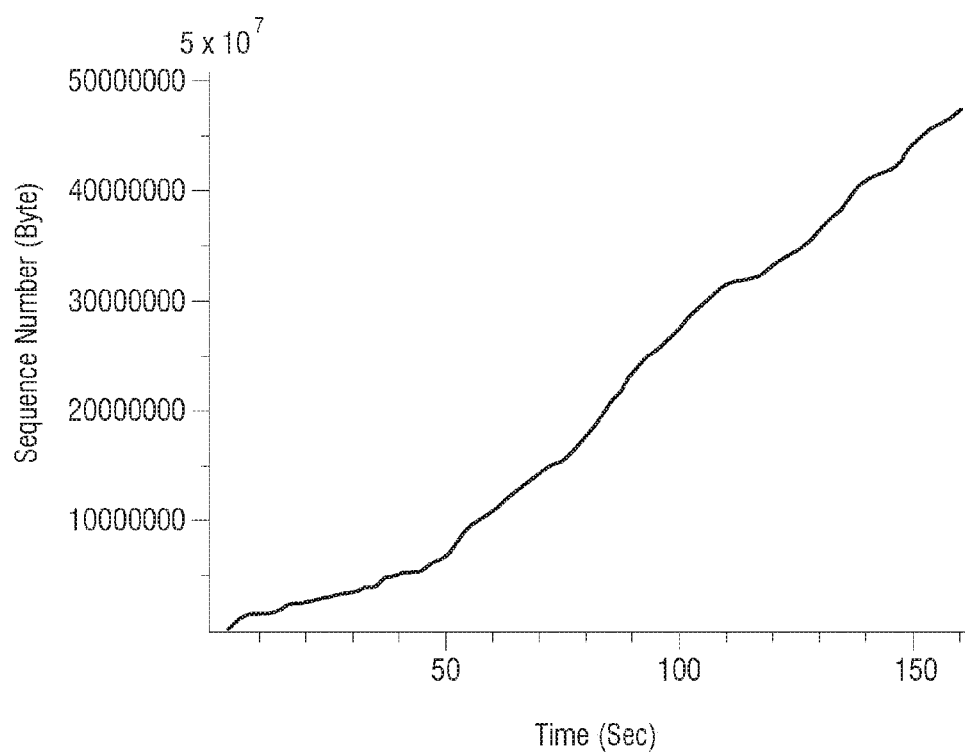
FIGS. 10A, 10B, and 10C are views illustrating experimental data in an environment in which the electronic apparatus is a laptop according to various embodiments of the present disclosure.
Figure 10B:
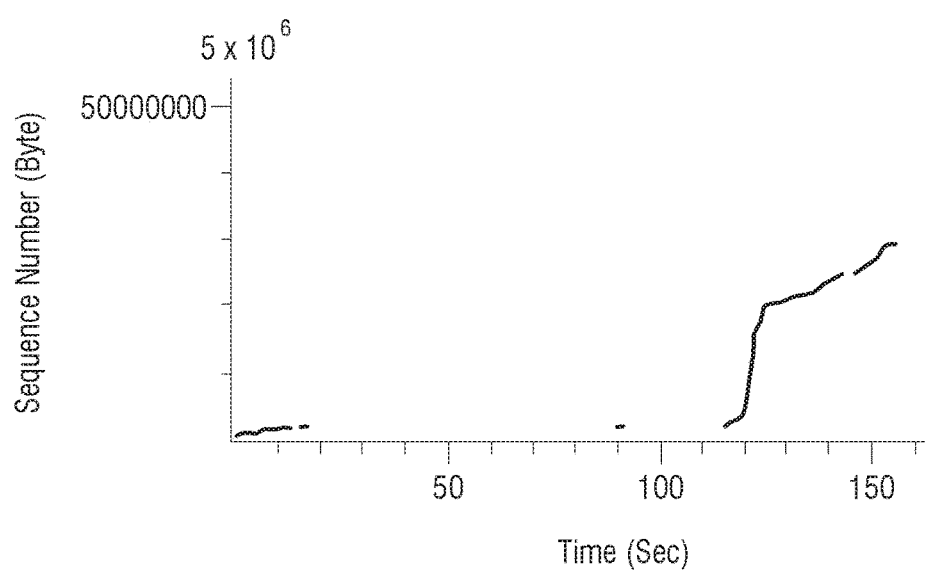
Figure 10C:
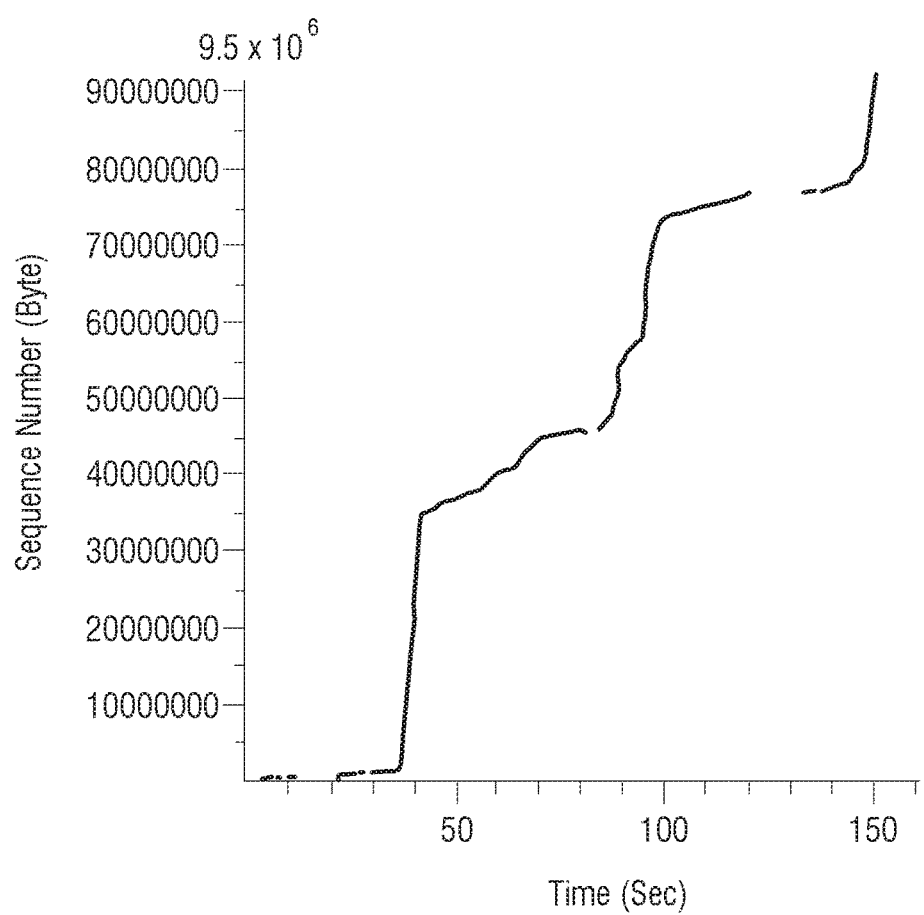

FIGS. 10A, 10B, and 10C are graphs showing experimental data in a laptop environment according to various embodiments of the present disclosure. The laptop used in the experiment performed WLAN and BT communication using a combo chip and a single antenna.

Referring to FIGS. 10A to 10C, the horizontal axis indicates time and the vertical axis indicate a sequence number.

FIG. 10A illustrates a graph showing a result of measuring TCP performance in a WLAN without using a BT communication function. That is, FIG. 10A illustrates a case in which time slots are allocated only to the WLAN communication method and there is no switch between communication methods. Since there is no deterioration in the communication performance caused by a switch of communication methods, a graph showing an increasing sequence number is illustrated in the embodiment of FIG. 10A. It can be seen that packets up to the sequence number of about $5 \times 10^7$ are transmitted after 150 seconds elapse in the case in which only the WLAN is used.

FIG. 10B illustrates a graph showing a result of measuring TCP performance in a related-art combo chip which uses a BT communication function with a WLAN. Comparing the sequence numbers at the same time in FIGS. 10A and 10B, it can be seen that deterioration in the communication performance in the related-art combo chip is serious. It can be seen that packets up to the sequence number of about $5 \times 10^6$ are transmitted after 150 seconds elapse in the related-art combo chip.

FIG. 10C illustrates a graph showing a result of measuring TCP performance in the electronic apparatus 100 according to an embodiment. In the embodiment of FIG. 10C, the processor 120 transmits information on generation and cancelation of a zero window advertisement to another apparatus using WLAN communication at the time when the communication method is switched. Comparing the sequence numbers at the same time in FIGS. 10B and 10C, it can be seen that the communication performance of the electronic apparatus 100 according to an embodiment is superior to the performance of the related-art combo chip. It can be seen that packets up to the sequence number of $9.5 \times 10^6$ are transmitted after 150 seconds elapse in the electronic apparatus 100.

According to various embodiments, the electronic apparatus 100 can enhance the communication performance by sharing information on the switch of the communication methods. In addition, the electronic apparatus 100 can enhance the communication performance by transmitting only a small amount of additional data in the TCP without having to correct a communication infrastructure.

Figure 11:
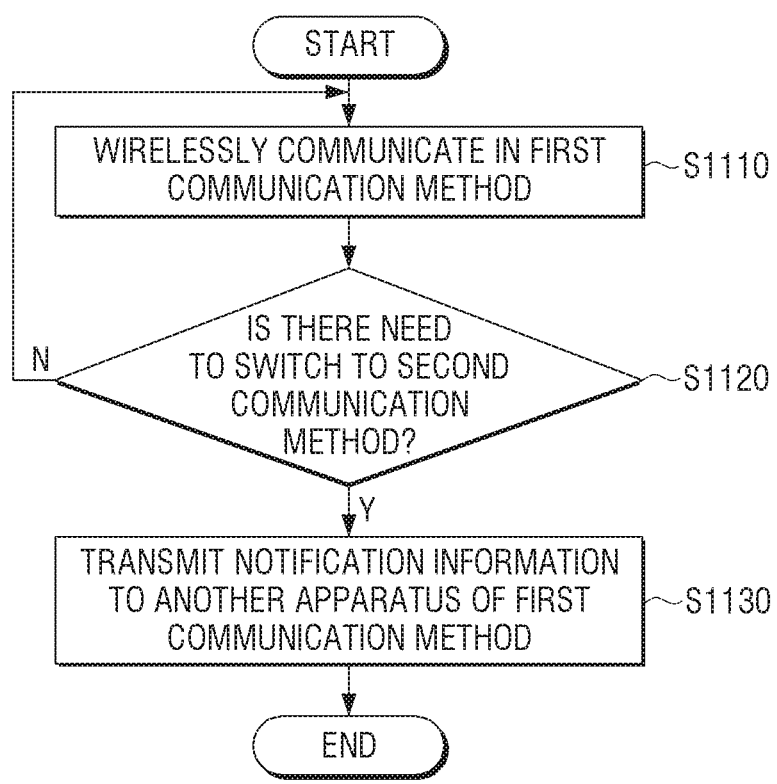
FIGS. 11 and 12 are flowcharts to illustrate a wireless communication method according to various embodiments of the present disclosure.
Figure 12:
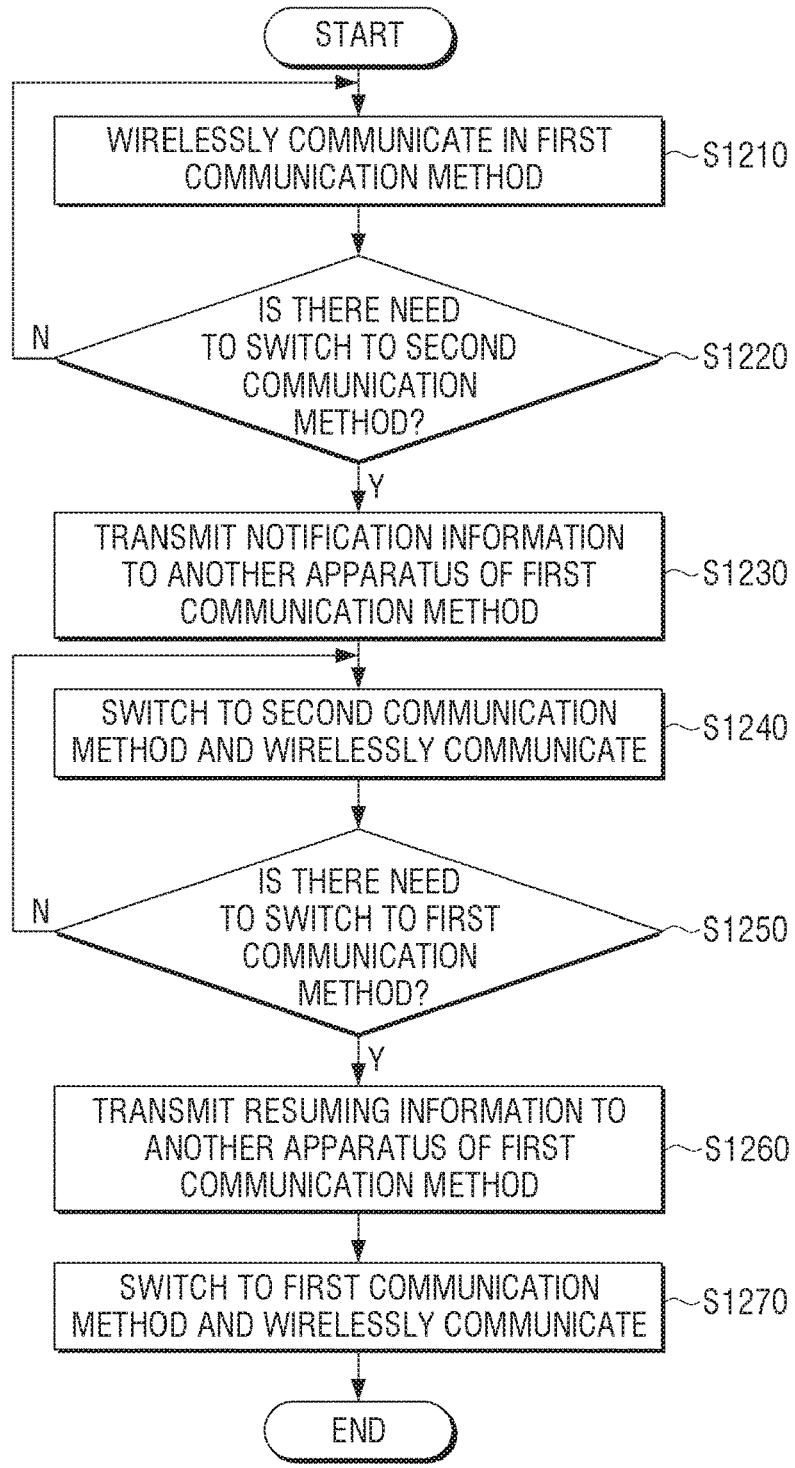

FIGS. 11 and 12 are flowcharts to illustrate a wireless communication method of the electronic apparatus 100 according to various embodiments of the present disclosure. The electronic apparatus 100 may communicate with external apparatuses using a plurality of wireless communication methods, and may perform the plurality of wireless communications methods using a single antenna.

FIG. 11 is a flowchart to illustrate the wireless communication method of the electronic apparatus 100 according to an embodiment.

Referring to FIG. 11, the electronic apparatus 100 may wirelessly communicate with the first external apparatus 200 in the first communication method at operation S1110. In addition, the electronic apparatus 100 may determine whether it is necessary to switch to the second communication method while using the first communication method at operation S1120. The electronic apparatus 100 may allocate time slots to wireless modules which use respective wireless communication methods in the TDM method. According to the time slot occupancy schedule, the electronic apparatus 100 may know the time to switch the communication method.

In response to it being determined that it is necessary to switch to the second communication method in the middle of using the first communication method at operation S1120-Y, the electronic apparatus 100 may transmit notification information of a transport layer to the first external apparatus 200 at operation S1130. The first external apparatus 200 which receives the notification information from the electronic apparatus 100 may halt transmission of packets until the electronic apparatus 100 informs the time to be able to communicate in the first communication method. In addition, the first external apparatus 200 may maintain the size of the transmission buffer of the transport layer as it is and prevent wireless communication performance from deteriorating when transmission is resumed thereafter. If it is determined at operation S1120-N that it is not necessary to switch to the second communication method in the middle of using the first communication method, the electronic apparatus 100 may return to operation S1110 to continue to wirelessly communicate with the first external apparatus 200 in the first communication method.

FIG. 12 is a flowchart to illustrate a wireless communication method of the electronic apparatus 100 according to an embodiment.

Referring to FIG. 12, the electronic apparatus 100 may wirelessly communicate with the first external apparatus 200 in the first communication method at operation S1210. The first communication method may be a WLAN communication method which uses a TCP. For example, the first communication method may be Wi-Fi or Wi-Fi direct.

In addition, the electronic apparatus 100 may determine whether it is necessary to switch to the second communication method while using the first communication method at operation S1220. The electronic apparatus 100 may allocate antenna use time to wireless communication modules which use the first communication method and the second communication method according to requests of applications. For example, the electronic apparatus 100 may schedule the time to use the respective communication methods by allocating the respective communication modules the occupancy time of time slots in the TDM method.

The electronic apparatus 100 may know the time to switch the communication method according to the schedule.

In response to it being determined that it is necessary to switch to the second communication method in the middle of using the first communication method at operation S1220-Y, the electronic apparatus 100 may transmit notification information of a transport layer to the first external apparatus 200 at operation S1230. The notification information may include information for instructing to maintain the size of the transmission buffer of the transport layer. The first external apparatus 200 which receives the notification information from the electronic apparatus 100 may halt transmission of packets until the electronic apparatus 100 informs the time to be able to communicate in the first communication method. If it is determined at operation S1220-N that it is not necessary to switch to the second communication method while using the first communication method, electronic apparatus 100 may return to operation S1210 to continue to wirelessly communicate with the first external apparatus 200 in the first communication method.

According to an embodiment, the electronic apparatus 100 may transmit the notification information to the first external apparatus 200 by taking into consideration RTT with respect to another apparatus using the first communication method (for example, the first external apparatus 200). For example, the electronic apparatus 100 may transmit the notification information to the first external apparatus 200 in advance as much time as half of average RTT before the first communication method is switched to the second communication method.

In addition, the electronic apparatus 100 may switch to the second communication method at the time of switching the communication method according to the schedule, and wirelessly communicate with the second external apparatus 300 at operation S1240.

The electronic apparatus 100 may determine whether it is necessary to switch to the first communication method while wirelessly communicating in the second communication method at operation S1250. In addition, in response to the electronic apparatus 100 entering the time slot allocated to the first communication method at operation S1250-Y, the electronic apparatus 100 may transmit resuming information to another apparatus using the first communication method at operation S1260. The resuming information may include information for releasing the first external apparatus 200 from the state in which the first external apparatus 200 is halting transmission of packets and standing by. In addition, the electronic apparatus 100 may switch to the first communication method again at the time of switching the communication method according to the schedule, and may wirelessly communicate with the first external apparatus 200 at operation S1270. If it is determined at operation S1250-N that it is not necessary to switch to the first communication method while wirelessly communicating in the second communication method, the electronic apparatus 100 may return to operation S1240 to continue to wirelessly communicate with the second external apparatus 300 in the second communication method.

Figure 13:
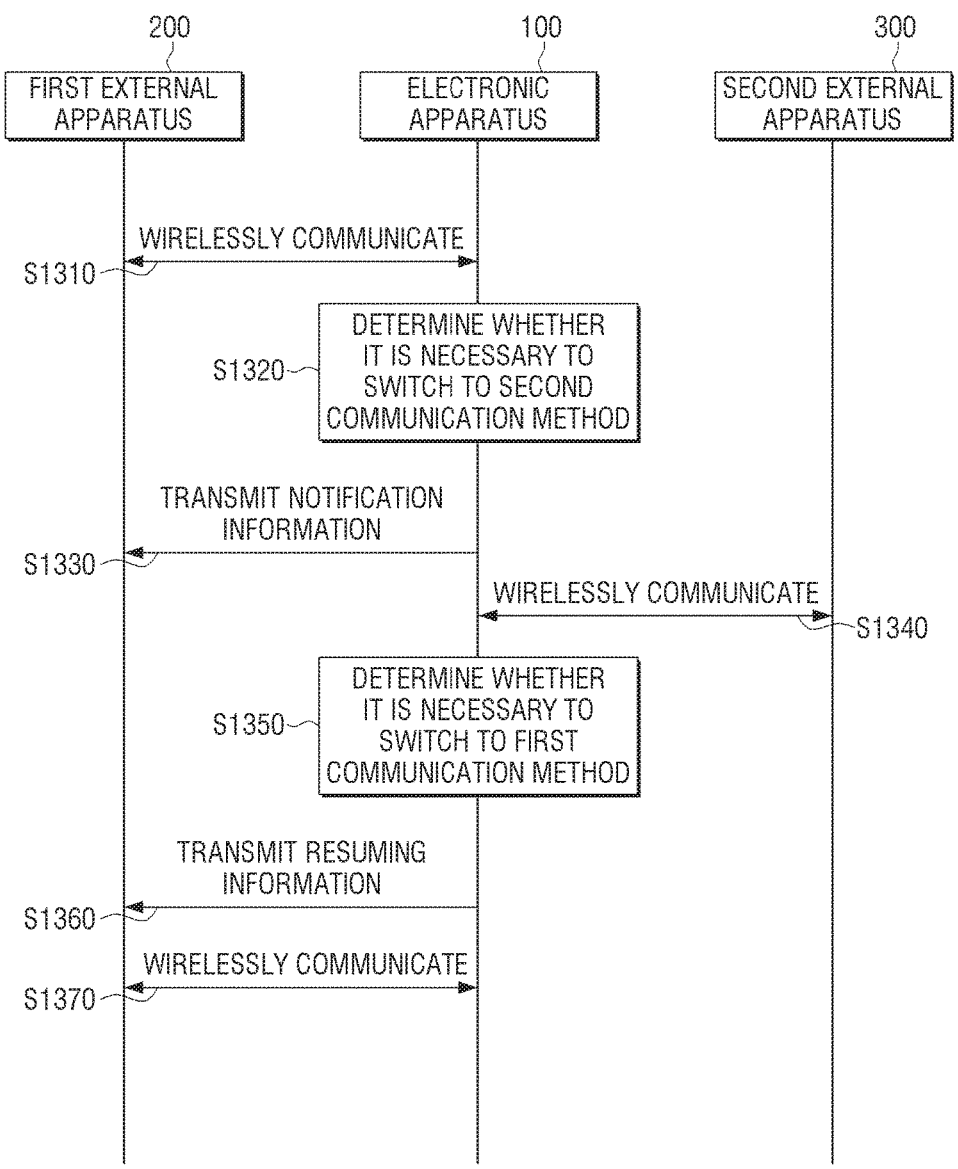
FIG. 13 is a sequence diagram to illustrate a wireless communication method according to an embodiment of the present disclosure.

FIG. 13 is a sequence diagram to illustrate a wireless communication method according to an embodiment of the present disclosure. The electronic apparatus 100 may communicate with the first external apparatus 200 in the first communication method. For example, the first communication method may be one of a WLAN, Wi-Fi, and Wi-Fi direct. In addition, the electronic apparatus 100 may communicate with the second external apparatus 300 in the second communication method. For example, the second communication method may be one of BT and BLE.

First, the electronic apparatus 100 may wirelessly communicate with the first external apparatus 200 according to a time slot occupancy schedule at operation S1310. For example, the electronic apparatus 100 may receive packets from the first external apparatus 200 using a TCP.

In addition, the electronic apparatus 100 may determine whether it is necessary to switch to the second communication method while communicating with the first external apparatus 200 at operation S1320. For example, in response to there being an application requesting communication with the second external apparatus 300, the electronic apparatus 100 may allocate a time slot using the second communication method. The electronic apparatus 100 may transmit notification information to the first external apparatus 200 at the time of switching to the second communication method at operation S1330. The first external apparatus 200 which receives the notification information may halt transmission of packets, maintain the size of the transmission buffer as it is, and wait until communication is resumed.

In response to the communication method being switched, the electronic apparatus 100 and the second external apparatus 300 may wirelessly communicate with each other in the second communication method at operation S1340. For example, the electronic apparatus 100 may transmit data to the second external apparatus 300 using Bluetooth.

In addition, the electronic apparatus 100 may determine whether it is necessary to switch to the first communication method while communicating with the second external apparatus 300 at operation S1350. The electronic apparatus 100 may transmit resuming information to the first external apparatus 200 at the time of switching to the first communication method at operation S1360. The first external apparatus 200 which receives the resuming information may recognize that the electronic apparatus 100 is currently able to receive packets. The first external apparatus 200 may continuously transmit the packets from the next packet of the packet previously transmitted. In addition, the first external apparatus 200 may transmit the packets with the size of the transmission buffer as maintained. In this way, the electronic apparatus 100 and the first external apparatus 200 may resume wirelessly communicating with each other at operation S1370.

According to various embodiments, the wireless communication method of the electronic apparatus 100 can enhance the communication performance of the electronic apparatus 100 by sharing the notification information and the resuming information with a transmitting end. According to various embodiments, since an existing communication infrastructure does not need to be corrected and only the TCP of the transmitting end is just corrected, the wireless communication performance of the electronic apparatus 100 can be enhanced at a low cost.

The above-described methods may be implemented in the form of program commands which are performed through various computers, and may be recorded on a computer-readable medium.

The computer-readable medium may include program commands, data files, and data structures either alone or in combination. The program commands recorded on the medium may be those that are especially designed and configured for the present disclosure, or may be those that are publicly known and available to those skilled in the art. Examples of the computer-readable medium include magnetic media such as hard disks, floppy disks and magnetic tapes, optical media such as compact disc read only memories (CD-ROMs) and digital versatile discs (DVDs), magneto-optical media such as floptical disks, and hardware devices such as ROMs, random access memories (RAMs) and flash memories that are especially configured to store and execute program commands. Examples of the program commands include machine language codes created by a compiler, and high-level language codes that can be executed by a computer by using an interpreter. The above-described hardware device may be configured to operate as one or more software modules to perform the operations according to various embodiments, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
    a communicator configured to communicate with a first external apparatus using a first communication method and communicate with a second external apparatus using a second communication method, the first communication method and the second communication method being different from each other; and
    a processor configured to control the communicator to:
        perform communication in the first communication method and the second communication method alternately, and,
        in response to there being a need to switch to the second communication method in a middle of using the first communication method, transmit notification information to the first external apparatus based on round-trip time (RTT) with respect to the first external apparatus to halt transmission of packets which is through the first communication method.

2. The electronic apparatus of claim 1, wherein the notification information comprises information for maintaining a transmission buffer size of a transport layer.

3. The electronic apparatus of claim 2, wherein, in response to there being a need to switch to the first communication method in a middle of using the second communication method, the processor is configured to control the communicator to transmit resuming information to the first external apparatus to resume transmitting as many packets as the maintained transmission buffer size.

4. The electronic apparatus of claim 3, wherein the processor is configured to control the communicator to transmit the resuming information based on the RTT with respect to the first external apparatus.

5. The electronic apparatus of claim 4, wherein the processor is configured to measure an average of the RTT with respect to the first external apparatus, and control the communicator to transmit the notification information and the resuming information in advance of transmission of the packets by as much time as half of the measured average of the RTT.

6. The electronic apparatus of claim 1, wherein the first communication method increases a transmission buffer size of a transport layer based on a previous buffer size of packets that the electronic apparatus is able to receive while maintaining communication.

7. The electronic apparatus of claim 1, wherein the first communication method is at least one of Wi-Fi and Wi-Fi direct, and the second communication method is at least one of Bluetooth, Bluetooth low energy (BLE) and ZigBee.

8. The electronic apparatus of claim 1, wherein the communicator and the processor are implemented by using a single chip.

9. The electronic apparatus of claim 1, wherein the communicator is configured to perform the first communication method and the second communication method using a single antenna.

10. A wireless communication method of an electronic apparatus, the wireless communication method comprising:
    wirelessly communicating with a first external apparatus in a first communication method; and
    in response to there being a need to switch to a second communication method in a middle of using the first communication method, transmitting notification information to the first external apparatus based on round-trip time (RTT) with respect to the first external apparatus to halt transmission of packets which is through the first communication method.

11. The wireless communication method of claim 10, wherein the notification information is information for maintaining a transmission buffer size of a transport layer.

12. The wireless communication method of claim 11, further comprising:
    switching to the second communication method and wirelessly communicating with a second external apparatus; and
    in response to there being a need to switch to the first communication method in a middle of using the second communication method, transmitting resuming information to the first external apparatus to resume transmitting as many packets as the maintained transmission buffer size.

13. The wireless communication method of claim 12, wherein the transmitting of the resuming information to the first external apparatus of the first communication method comprises transmitting the resuming information by taking into consideration the RTT with respect to the first external apparatus of the first communication method.

14. The wireless communication method of claim 13, wherein the transmitting of the notification information or the resuming information by taking into consideration the RTT comprises:
    measuring an average of the RTT with respect to the first external apparatus of the first communication method; and
    transmitting the notification information or the resuming information in advance of transmission of the packets by as much time as half of the measured average of the RTT.

15. The wireless communication method of claim 10, wherein the first communication method increases a transmission buffer size of a transport layer based on a previous buffer size of packets that the electronic apparatus is able to receive while maintaining communication.

16. A non-transitory computer readable recording medium including a program for executing a wireless communication method of an electronic apparatus, the wireless communication method comprising:
    wirelessly communicating with a first external apparatus in a first communication method; and
    in response to there being a need to switch to a second communication method in a middle of using the first communication method, transmitting notification information to the first external apparatus based on round-trip time (RTT) with respect to the first external apparatus to halt transmission of packets which is through the first communication method.

17. The non-transitory computer readable recording medium of claim 16, wherein the notification information comprises information for maintaining a transmission buffer size of a transport layer.

\* \* \* \* \*